United States Patent [19]

Nusser

[11] Patent Number: 5,014,031
[45] Date of Patent: May 7, 1991

[54] ULTRA PRECISION PRESSURE REGULATOR

[76] Inventor: Heinz Nusser, 4 Greenridge Dr., Brookfield, Conn. 06804

[21] Appl. No.: 382,943

[22] Filed: Jul. 21, 1989

[51] Int. Cl.⁵ .............................................. H01F 7/08
[52] U.S. Cl. .................................... 335/230; 335/273; 251/129.18
[58] Field of Search ............... 335/229, 230, 234, 270, 335/273, 279; 251/129.14, 129.18

[56] References Cited

U.S. PATENT DOCUMENTS 3,571,769 3/1971 Pegram ................................ 335/230
3,928,988 12/1975 Lüth ................................ 335/234 X Primary Examiner—George Harris

[57] ABSTRACT

A valve actuator for use in a pressure regulator. It comprises an electromagnetic having a plurality of pole pieces. A valve actuating permanent magnet is moveably secured to one of the pole pieces. The pole pieces are so disposed relative to each other that four distinct magnetic forces combine to urge the permanent magnet in a first or second direction depending on the polarity of current applied to a coil disposed about one of said pole pieces.

8 Claims, 1 Drawing Sheet

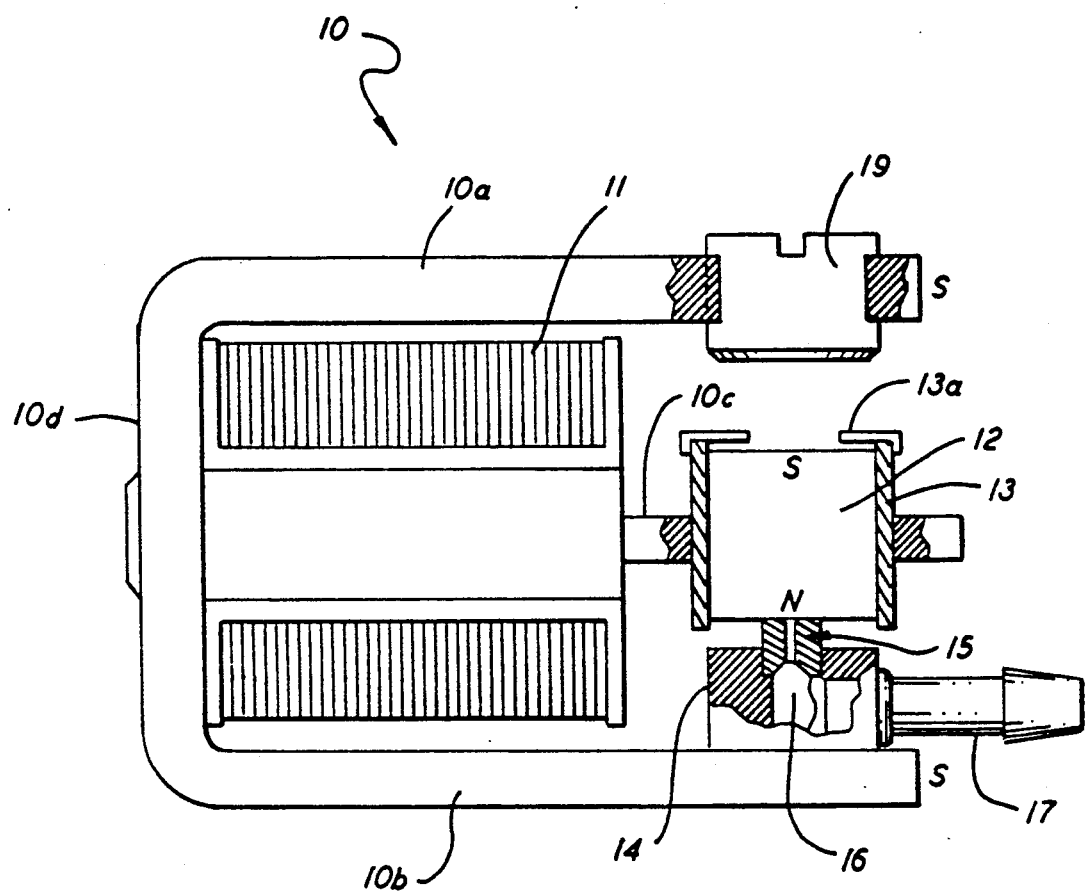

ULTRA PRECISION PRESSURE REGULATOR

BACKGROUND OF THE INVENTION

Regulation of gas pressure within a tank volume may be obtained by controlling the bleed rate via a small orifice in communication with the tank volume by means of some type of blocking element, e.g., a bimorph strip or electromagnetically operated armature. Precision of control is obtainable with such arrangements to almost any desired degree if cost is no object.

The present invention relates to an electromagnet of unique design which while simple and inexpensive is, as far as is known, as accurate for control purposes as any device presently available.

BRIEF DESCRIPTION OF THE INVENTION

The present invention comprises a valve actuator for use in a pressure regulator. It comprises an E-shaped electromagnet having an inner pole piece disposed between two outer pole pieces. A permanent magnet is moveably secured to the inner pole piece and normally covers an orifice formed in one of the outer pole pieces. Adjustable means associated with the other outer pole piece controls the force at which the permanent magnet covers the orifice. A coil disposed about said inner pole piece induces a flux which makes the outer pole pieces either both north or south and the inner pole have an opposite magnetic polarity combining four distinct magnetic forces urging the permanent magnet toward or away from the orifice. Servo means maintain pressure within a volume at a predetermined value by sensing pressure within the volume and venting it via the orifice by controlling the position of the permanent magnet relative to the orifice.

BRIEF DESCRIPTION OF THE DRAWING

The FIGURE is an elevational view, partly in section, of the valve actuator of the present invention.

DESCRIPTION

The FIGURE shows an electromagnet 10. The electromagnet 10 comprises outer pole pieces 10a and 10b and an inner pole piece 10c disposed between the outer pole pieces 10a and 10b. The pole pieces are connected via base element 10d and together form an E-shaped structure of magnetic material.

The inner pole piece 10c has a coil 11 disposed thereon. Current through the coil 11 induces a magnetic flux which make the outer pole pieces 10a and 10b have the same polarity, e.g., both north or both south and the inner pole piece to have the opposite polarity. The particular manner by which coil 11 is energized is not shown but may be accomplished in any convenient manner. Polarity and magnitude of current through coil 11 determine polarity of the pole pieces as well as the magnetic force acting on permanent magnet 12.

The permanent magnet 12 is moveably secured to inner pole piece 10c. As shown in the FIGURE this may be accomplished by means of a cylinder 13 in which the permanent magnet 12 is slidable disposed. Alternatively, a permanent magnet may be fixed to inner pole piece 10c by means of flexure means, not shown. In both cases the movement of the permanent magnet is limited. In the embodiment shown this is accomplished by lip 13a of cylinder 13 which limits movement of the permanent magnet 12 in a first direction. Movement of the permanent magnet 12 in the opposite direction is limited by abutment against the structure forming an orifice in the pole piece 10b as explained more fully below.

Pole piece 10b has an extension 14 formed thereon. Extension 14 includes structure which forms an orifice 15. Orifice 15 communicates with tubular extension via passage 16 formed in extension 14. Orifice 15 extends upwardly from the maintain body of extension 14 such that when permanent magnet 12 abuts the orifice 15 it does so without contacting the rest of the extension 14.

Pole piece 10a has a screw 19 associated therewith. The screw 19 is adjustable to move away from or toward permanent magnet 12 by adjustment in threaded opening 20 in pole piece 10a. The proximity of screw 19 to permanent magnet 12 affects the force with which permanent 12 is held against the orifice 15 for a given magnitude of current through coil 11. The screw 19 has the same magnetic polarity as its associated pole piece 10a.

In the FIGURE the polarity of current through coil 11 is such that the magnetic forces urge permanent magnet against orifice 15. As shown, pole pieces 10a and 10b are south poles and pole piece 10c is a north pole. With the polarity of permanent magnet 12, as shown, four forces act on it. The south pole of pole piece 10 repels magnet 12. The north pole of pole piece 10c attracts the south pole and repels the north pole of permanent magnet 12. Finally, the south pole of pole piece 10b attracts permanent magnet 12. Thus, four discrete forces act on and urge permanent in a direction to abut orifice 15.

If the direction of current is reversed the four magnetic forces act in the opposite direction, i.e., to urge magnet 12 away from orifice 15. With a regular U-shape electromagnet you would only have 2 forces working on the moveable magnet, cancelling each other.

With the electromagnet described there is no force cancellation, and you automatically obtain magnetic forces giving increased sensitivity, which means higher accuracy with less servo loop gain.

The force necessary to maintain orifice 15 closed by permanent magnet 12 when the pressure in the tank is at a desired predetermined is determinant of the amplitude of d.c. current necessary to be passed through coil 11. The orifice 15 is not actually closed at the desired "tank" pressure. The permanent magnet 12 is held hovering above the orifice at a very small distance in order to obtain the correct bleed rate of the constant feeding pressure which gives the correct tank pressure.

The distance is controlled by the servo loop by means of a pressure to voltage sensor monitoring the tank pressure.

If the tank pressure drops, the servo alters the current and direction through the coil making the permanent magnet getting closer to the orifice, thus decreasing the bleed rate.

If the tank pressure increases, the servo moves the permanent magnet away from the orifice, increasing the bleed rate.

The screw 19 serves as a midrange adjustment for the desired pressure regulating range and compensates for production variances in the electromagnetic assembly.

What is claimed is:

1. An electromagnet comprising:
    an armature of magnetic material having an inner pole piece disposed between two outer pole pieces;

permanent magnet means fixed to said inner pole piece and movable relative thereto;

means forming an orifice in one of said outer pole pieces disposed opposite a pole of said permanent magnet means at a distance such that said magnet is normally attracted to said one outer pole piece for holding said permanent magnet means against said orifice;

adjustable means associated with the other of said outer pole pieces for controlling the magnetic force at which said permanent magnet means is held against said orifice.

2. An electromagnet according to claim 1 comprising:

coil means disposed about said inner pole piece for causing said outer pole pieces to be of a first or second polarity and said inner pole piece to be of the opposite polarity depending on the polarity of the current applied to said coil means.

3. An electromagnet according to claim 2 wherein said orifice forming means extends a distance so that said permanent magnet means is separated from the main body of said pole piece when it contacts said orifice forming means.

4. An electromagnet according to claim 3 wherein said adjustable means comprises:

screw means which effectively varies the distance said other pole piece is from said permanent magnet means.

5. An electromagnet means according to claim 4 wherein said permanent magnet means comprises:

a permanent magnet;

cylinder means fixed to said inner pole piece;

said permanent magnet slidably disposed in said cylinder.

6. An electromagnet according to claim 4 wherein said permanent magnet means comprises:

a permanent magnet;

flexure means fixing said permanent magnet to said inner pole piece.

7. An electromagnet according to claim 5 further comprising:

tank means for communicating with the ambient via said orifice, servo control means connected between said tank means and said coil means for applying current to said coil means of a magnitude and polarity for opening or closing said orifice to maintain pressure within said tank means at a predetermined amount.

8. An electromagnet according to claim 6 further comprising:

tank means for communicating with the ambient via said orifice;

servo control means connected between said tank means and said coil means for applying current to said coil means of a magnitude and polarity for opening or closing said orifice to maintain pressure within said tank means at a predetermined amount.

* * * * *